(12) United States Patent
Zones

(10) Patent No.: US 8,512,674 B1
(45) Date of Patent: Aug. 20, 2013

(54) PREPARATION OF MOLECULAR SIEVE SSZ-23

(75) Inventor: Stacey Ian Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 77 days.

(21) Appl. No.: 13/409,733

(22) Filed: Mar. 1, 2012

(51) Int. Cl.
*C01B 39/00* (2006.01)
*C01B 33/36* (2006.01)
*C01B 39/04* (2006.01)
*C01F 7/00* (2006.01)

(52) U.S. Cl.
USPC ........... 423/700; 423/701; 423/702; 423/704; 423/705

(58) Field of Classification Search
None
See application file for complete search history.

(56) References Cited

U.S. PATENT DOCUMENTS

| | | |
|---|---|---|
| 4,665,110 A | 5/1987 | Zones |
| 4,859,442 A | 8/1989 | Zones et al. |
| 4,902,844 A | 2/1990 | Zones et al. |
| 4,952,744 A | 8/1990 | Zones et al. |
| 5,609,751 A | 3/1997 | Wall |
| 7,641,787 B2 | 1/2010 | Yaluris et al. |
| 7,858,059 B2 | 12/2010 | Davis et al. |
| 2010/0160700 A1 | 6/2010 | O'Rear et al. |
| 2010/0254895 A1 | 10/2010 | Zones |

OTHER PUBLICATIONS

PCT International Search Report, PCT/US2013/025324, mailed Apr. 22, 2013.
S.I. Zones and S.-J. Hwang "A Novel Approach to Borosilicate Zeolite Synthesis in the Presence of Fluoride" Microporous Mesoporous Mater. 2011, 146, 48-56.
M.A. Camblor, M.-J. Diaz-Cabanas, P.A. Cox, I.J. Shannon, P.A. Wright, R.E. Morris "A Synthesis, MAS NMR, Synchrotron X-ray Powder Diffraction, and Computational Study of Zeolite SSZ-23" Chem. Mater. 1999, 11, 2878-2885.
M.A. Camblor, M.-J. Diaz-Cabanas, J. Perez-Pariente, S.J. Teat, W. Clegg, I.J. Shannon, P. Lightfoot, P.A. Wright, and R.E. Morris "SSZ-23: An Odd Zeolite with Pore Openings of Seven and Nine Tetrahedral Atoms" Angew. Chem. Int. Ed. 1998, 37, 2122-2126.

*Primary Examiner* — Bijay Saha
(74) *Attorney, Agent, or Firm* — Terrence Flaherty

(57) ABSTRACT

Disclosed is a method for preparing molecular sieve SSZ-23 using a mixture of an N,N,N-trialkyl adamantammonium cation structure directing agent and an N,N'-dialkyl-1,4-diazabicyclo[2.2.2]octane dication.

18 Claims, No Drawings

PREPARATION OF MOLECULAR SIEVE SSZ-23

TECHNICAL FIELD

The application relates generally to a method for preparing molecular sieve SSZ-23 using an N,N,N-trialkyl adamantammonium cation and an N,N'-dialkyl-1,4-diazabicyclo[2.2.2]octane dication.

BACKGROUND

Molecular sieves are a commercially important class of crystalline materials. They have distinct crystal structures with ordered pore structures which are demonstrated by distinct X-ray diffraction (XRD) patterns. The crystal structure defines cavities and pores which are characteristic of the different species.

SSZ-23 is a molecular sieve material which has a unique two-dimensional channel system composed of intersecting 9- and 7-membered ring pores. SSZ-23 has been assigned structure type STT by the Structure Commission of the International Zeolite Association.

The composition and characteristic XRD pattern of SSZ-23 are disclosed in U.S. Pat. No. 4,859,442, which also describes the synthesis of the molecular sieve in the presence of an N,N,N-trialkyl adamantammonium cation structure directing agent.

SSZ-23 is useful in many processes, including various catalytic reactions. For example, U.S. Pat. No. 4,902,844 exemplifies the use of SSZ-23 as a catalyst in xylene isomerization reactions; U.S. Pat. No. 4,952,744 discloses that SSZ-23 is useful as a catalyst in the conversion of lower alkanols, such as methanol, to form gasoline boiling range hydrocarbons; U.S. Pat. No. 5,609,751 and U.S Patent Application Publication No. 2010/0160700 disclose that SSZ-23 can be useful as a catalyst for reforming naphthas to aromatics; U.S. Pat. No. 7,641,787 discloses the use of SSZ-23 as a catalyst in the reduction of $NO_x$ in flue gas streams exiting from fluid catalytic cracking (FCC) regenerators; and U.S. Pat. No. 7,858,059 discloses that SSZ-23 is useful as an adsorbent in hydrocarbon traps for the treatment of engine exhaust.

To date, however, the commercial development of SSZ-23 has been hindered by the high cost of the structure directing agent required for its synthesis and hence there is significant interest in finding alternative, less expensive means for the synthesis of SSZ-23.

SUMMARY

In one aspect, there is provided a method for preparing molecular sieve SSZ-23, comprising contacting under crystallization conditions a reaction mixture comprising: (1) at least one source of an oxide of a tetravalent element; (2) at least one source of an oxide of a trivalent element; (3) fluoride ions; (4) water; (5) at least one N,N,N-trialkyl adamantammonium cation; and (6) at least one N,N'-dialkyl-1,4-diazabicyclo[2.2.2]octane dication.

DETAILED DESCRIPTION

The following terms will be used throughout the specification and will have the following meanings unless otherwise indicated.

The term "active source" means a reagent or precursor material capable of supplying at least one element in a form that can react and which can be incorporated into the molecular sieve structure. The terms "source" and "active source" are used interchangeably herein.

The term "Periodic Table" refers to the version of the IUPAC Periodic Table of the Elements dated Jun. 22, 2007, and the numbering scheme for the Periodic Table Groups is as described in Chem. Eng. News, 63(5), 26-27 (1985).

Reaction Mixture

In general, SSZ-23 is prepared by: (a) preparing a reaction mixture containing: (1) at least one source of an oxide of a tetravalent element; (2) at least one source of an oxide of a trivalent element; (3) fluoride ions; (4) water; (5) at least one N,N,N-trialkyl adamantammonium cation; and (6) at least one N,N'-dialkyl-1,4-diazabicyclo[2.2.2]octane dication; and (b) maintaining the reaction mixture under conditions sufficient to form crystals of the molecular sieve.

The composition of the reaction mixture from which the molecular sieve is formed, in terms of mole ratios, is identified in Table 1 below:

TABLE 1

| Reactants | Broad | Preferred |
|---|---|---|
| $YO_2/W_2O_3$ | 5 to 1500 | 5 to 150 |
| $(Q + A)/YO_2$ | 0.15 to 1.0 | 0.2 to 0.6 |
| $F/YO_2$ | 0.1 to 1.0 | 0.15 to 0.6 |
| $H_2O/YO_2$ | 2 to 100 | 5 to 50 | wherein Y is at least one tetravalent element; W is at least one trivalent element; Q is at least one N,N,N-trialkyl adamantammonium cation, and Q>0; and A is at least one N,N'-dialkyl-1,4-diazabicyclo[2.2.2]octane dication ("dialkyl DABCO dication"), and A>0. The N,N,N-trialkyl adamantammonium cation and the dialkyl DABCO dication are typically associated with anions which can be any anion that is not detrimental to the formation of the molecular sieve. Representative anions include chloride, bromide, iodide, hydroxide, acetate, sulfate, tetrafluoroborate, carboxylate, and the like.

In one embodiment, tetravalent element Y is selected from the group consisting of silicon (Si), germanium (Ge) and mixtures thereof. In one sub-embodiment, Y is silicon.

Sources of silicon oxide useful herein can include fumed silica, precipitated silicates, silica hydrogel, silicic acid, colloidal silica, tetra-alkyl orthosilicates (e.g. tetraethyl orthosilicate), and silica hydroxides. Sources useful for germanium include germanium oxide and germanium ethoxide.

In one embodiment, trivalent element W is selected from the group consisting of boron (B), aluminum (Al), gallium (Ga), iron (Fe) and mixtures thereof. In one sub-embodiment, W is selected from the group consisting of boron, aluminum and mixtures thereof. In another sub-embodiment, W is boron. In yet another sub-embodiment, W is aluminum.

Sources of boron oxide which can be useful include borosilicate glasses, alkali borates, boric acid, borate esters, and certain molecular sieves. Non-limiting examples of a source of boron oxide include potassium tetraborate decahydrate and boron beta molecular sieve (B-beta molecular sieve).

Sources of aluminum oxide useful herein include aluminates, alumina, and aluminum compounds such as $AlCl_3$, $Al_2SO_4$, $Al(OH)_3$, kaolin clays, and other zeolites. Gallium and iron can be added in forms corresponding to their aluminum counterpart.

In some embodiments, the mole ratio of the at least one N,N,N-trialkyl adamantammonium cation (Q) to the at least one N,N'-dialkyl-1,4-diazabicyclo[2.2.2]octane dication (A) is at least 0.05 (e.g., from 0.1 to 4, from 0.25 to 4, or from 0.25 to 1). Use of an N,N'-dialkyl-1,4-diazabicyclo[2.2.2]octane dication in the reaction mixture permits a reduction in the amount of N,N,N-trialkyl adamantammonium cation used to prepare the molecular sieve, which results in significant cost savings. In fact, it has been found that, by using an N,N'-dialkyl-1,4-diazabicyclo[2.2.2]octane dication in the reaction mixture, the amount of the N,N,N-trialkyl adamantammonium cation can be reduced to a level below that which is required to fill the micropore volume of the molecular sieve, i.e., an amount less than that required to crystallize the molecular sieve in the absence of the N,N'-dialkyl-1,4-diazabicyclo[2.2.2]octane dication.

In one embodiment, the N,N,N-trialkyl adamantammonium cation structure directing agent is an N,N,N-trialkyl-1-adamantammonium cation which is represented by the following structure (1):

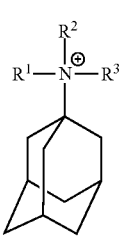

(1)

where $R^1$, $R^2$ and $R^3$ are independently selected from the group consisting of $C_1$ to $C_4$ alkyl groups. In one sub-embodiment, $R^1$, $R^2$ and $R^3$ are each a methyl group.

In another embodiment, the N,N,N-trialkyl adamantammonium cation structure directing agent is an N,N,N-trialkyl-2-adamantammonium cation which is represented by the following structure (2):

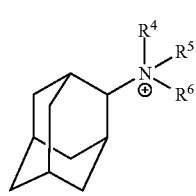

(2)

where $R^4$, $R^5$ and $R^6$ are independently selected from the group consisting of $C_1$ to $C_4$ alkyl groups. In one sub-embodiment, $R^4$, $R^5$ and $R^6$ are each a methyl group. The N,N,N-trialkyl adamantammonium cation structure directing agent can be a mixture of compounds represented by structures (1) and (2).

The N,N'-dialkyl-1,4-diazabicyclo[2.2.2]octane dication is represented by the following structure (3):

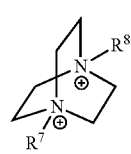

(3)

where $R^7$ and $R^8$ are independently selected from the group consisting of $C_1$ to $C_4$ alkyl groups. In one embodiment, $R^7$ and $R^8$ are each a methyl group.

The source of fluoride ions can be any compound capable of releasing fluoride ions in the synthesis mixture. Non-limiting examples of such sources of fluoride ions include hydrogen fluoride, ammonium fluoride and tetraalkylammonium fluorides (e.g., tetramethylammonium fluoride, tetraethylammonium fluoride).

The reaction mixture can be substantially free of elements from Groups 1 and 2 of the Periodic Table. As used herein, the terms "substantially free of elements from Groups 1 and 2 of the Periodic Table," and "substantially in the absence of elements from Groups 1 and 2 of the Periodic Table" are synonymous and mean elements from Groups 1 and 2 are completely absent from the reaction mixture or are present in quantities that have less than a measurable effect on, or confer less than a material advantage to, the synthesis of the molecular sieves described herein (e.g., $Na^+$ is present as an impurity of one or more of the reactants). A reaction mixture substantially free of elements from Groups 1 and 2 of the Periodic Table will typically contain, for example, a M/T molar ratio of between 0 and less than 0.02 (e.g., $0 \leq M/T < 0.01$), wherein M represents elements from Groups 1 and 2 of the Periodic Table, and T=Y+W, wherein compositional variables Y and W are as described herein above (e.g., T=Si+B for borosilicate SSZ-23). Running the synthesis substantially in the absence of elements from Groups 1 and 2 of the Periodic Table has the advantage of being able to prepare a catalyst from the synthesis product by using calcination alone, i.e., no ion-exchange step (to remove alkali or alkaline earth cations) is necessary.

For each embodiment described herein, the molecular sieve reaction mixture can be supplied by more than one source. Also, two or more reaction components can be provided by one source. As an example, borosilicate molecular sieves can be synthesized from boron-containing beta molecular sieves, as taught in U.S. Pat. No. 5,972,204.

The reaction mixture can be prepared either batch-wise or continuously. Crystal size, crystal morphology, and crystallization time of the molecular sieve can vary with the nature of the reaction mixture and the crystallization conditions.

Crystallization and Post-Synthesis Treatment

In practice, the molecular sieve is prepared by (a) preparing a reaction mixture as described herein above; and (b) maintaining the reaction mixture under crystallization conditions sufficient to form crystals of the molecular sieve.

The reaction mixture is maintained at an elevated temperature until crystals of the molecular sieve are formed. The hydrothermal crystallization is usually conducted under pressure, and usually in an autoclave so that the reaction mixture is subjected to autogenous pressure, at a temperature between 125° C. and 200° C.

The reaction mixture can be subjected to mild stirring or agitation during the crystallization step. It will be understood by a person skilled in the art that the molecular sieves described herein can contain impurities, such as amorphous materials, unit cells having framework topologies which do not coincide with the molecular sieve, and/or other impurities (e.g., organic hydrocarbons).

During the hydrothermal crystallization step, crystals of molecular sieve can be allowed to nucleate spontaneously from the reaction mixture. The use of crystals of the molecular sieve as seed material can be advantageous in decreasing the time necessary for complete crystallization to occur. When used as seeds, seed crystals are typically added in an amount between 1% and 10% of the weight of the source for compositional variable Y used in the reaction mixture.

Once the molecular sieve crystals have formed, the solid product can be separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieves made by the process described herein have a composition, as-synthesized and in the anhydrous state, in terms of mole ratios as indicated in Table 2 below, wherein compositional variables Y, W, Q and A are as described herein above:

TABLE 2

|  | Broad | Preferred |
|---|---|---|
| $YO_2/W_2O_3$ | 5 to 1500 | 10 to 150 |
| $(Q + A)/SiO_2$ | 0.015 to 0.06 | 0.025 to 0.06 |

In one sub-embodiment, the molecular sieves made by the process described herein have a composition, as-synthesized and in the anhydrous state, in terms of mole ratios as indicated in Table 3 below, wherein Q and A are as described herein above:

TABLE 3

|  | Broad | Preferred |
|---|---|---|
| $SiO_2/Al_2O_3$ | 5 to 1500 | 10 to 150 |
| $(Q + A)/SiO_2$ | 0.015 to 0.06 | 0.025 to 0.06 |

In another sub-embodiment, the as-synthesized SSZ-23 has a $SiO_2/Al_2O_3$ mole ratio of from 20 to 1500 (e.g., from 20 to 150).

SSZ-23 can be used as-synthesized, but typically the molecular sieve will be thermally treated (calcined). The term "as-synthesized" refers to the molecular sieve in its form after crystallization, prior to the removal of the organic cations (Q and A). The organic cations can be removed by thermal treatment (e.g., calcination), preferably in an oxidative atmosphere (e.g., air, gas with an oxygen partial pressure of greater than 0 kPa) at a temperature (readily determinable by one skilled in the art) sufficient to remove the organic cations from the molecular sieve. The organic cations can also be removed by photolysis techniques (e.g., exposing the molecular sieve product to light or electromagnetic radiation that has a wavelength shorter than visible light under conditions sufficient to selectively remove the organic compound(s) from the molecular sieve) as described in U.S. Pat. No. 6,960,327.

The molecular sieve can subsequently be calcined in steam, air or inert gas at temperatures ranging from 200° C. to 800° C. for periods of time ranging from 1 to 48 hours, or more.

EXAMPLES

The following illustrative examples are intended to be non-limiting.

Example 1

In a 23 mL Teflon cup, 2.9 g of tetraethyl orthosilicate (TEOS, 14 mmol $SiO_2$) was combined with an aqueous solution (1.27 g) of N,N,N-trimethyl-1-adamantammonium hydroxide (1.5 mmol) followed by addition of a solution (2.36 g) with N,N'-dimethyl DABCO dihydroxide (3 mmol). Next, boric acid (2 mmol) and $NH_4F$ (4.5 mmol) were added. Finally, boron SSZ-23 seed crystals from a previous synthesis, in which N,N,N-trimethyl-1-adamantammonium hydroxide alone was used as the SDA, were added. The cup was closed for two days in order to allow the TEOS hydrolyze and to allow the water and the resulting ethanol to evaporate. The $H_2O/SiO_2$ mole ratio was then adjusted to 20. The Teflon liner was then capped and placed within a Parr stainless-steel autoclave reactor. The autoclave was then fixed in a rotating spit (43 rpm) within an oven heated at 160° C. for 6 days. The solid products were recovered from the cooled reactor by vacuum filtration, washed with water and dried in a vacuum oven at 120° C. overnight. The product was SSZ-23 as determined by powder XRD.

Example 2

The procedure of Example 1 was repeated except that half of the boron was replaced by aluminum (Reheis F-2000 aluminum hydroxide as reagent source). The product was SSZ-23 as determined by powder XRD.

Example 3

The solid product from Example 2 was calcined inside a muffle furnace to 595° C. at a rate of 1° C./min and held at 595° C. for five hours. Elemental analysis indicated that the calcined product contained 42 wt. % Si, 1 wt. % Al, and 0.5 wt. % B.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing molecular sieve SSZ-23, comprising contacting under crystallization conditions a reaction mixture comprising: (1) at least one source of an oxide of a tetravalent element; (2) at least one source of an oxide of a trivalent element; (3) fluoride ions; (4) water; (5) at least one N,N,N-trialkyl adamantammonium cation; and (6) at least one N,N'-dialkyl-1,4-diazabicyclo[2.2.2]octane dication.

2. The method of claim 1, wherein the molecular sieve is prepared from a reaction mixture comprising, in terms of mole ratios, the following:

| | |
|---|---|
| $YO_2/W_2O_3$ | 5 to 1500 |
| $(Q + A)/YO_2$ | 0.15 to 1.0 |
| $F/YO_2$ | 0.1 to 1.0 |
| $H_2O/YO_2$ | 2 to 100 | wherein Y is at least one tetravalent element; W is at least one trivalent element; Q is at least one N,N,N-trialkyl adamantammonium cation, and Q>0; and A is at least one N,N'-dialkyl-1,4-diazabicyclo[2.2.2]octane dication, and A>0.

3. The method of claim 2, wherein Y is selected from the group consisting of Si, Ge and mixtures thereof.

4. The method of claim 3, wherein Y is Si.

5. The method of claim 2, wherein W is selected from the group consisting of B, Al and mixtures thereof.

6. The method of claim 2, wherein Y is Si and W is selected from the group consisting of B, Al and mixtures thereof.

7. The method of claim 1, wherein the mole ratio of the N,N,N-trialkyl adamantammonium cation structure directing agent to the N,N'-dialkyl-1,4-diazabicyclo[2.2.2]octane dication is from 0.1 to 4.

8. The method of claim 1, wherein the mole ratio of the N,N,N-trialkyl adamantammonium cation structure directing agent to the N,N'-dialkyl-1,4-diazabicyclo[2.2.2]octane dication is from 0.25 to 1.

9. The method of claim 1, wherein the at least one N,N,N-trialkyl adamantammonium cation structure directing agent is an N,N,N-trialkyl-1-adamantammonium cation.

10. The method of claim 9, wherein the N,N,N-trialkyl-1-adamantammonium cation is an N,N,N-trimethyl-1-adamantammonium cation.

11. The method of claim 1, wherein the at least one N,N,N-trialkyl adamantammonium cation structure directing agent is an N,N,N-trialkyl-2-adamantammonium cation.

12. The method of claim 11, wherein the N,N,N-trialkyl-2-adamantammonium cation is an N,N,N-trimethyl-2-adamantammonium cation.

13. The method of claim 1, wherein the at least one N,N'-dialkyl-1,4-diazabicyclo[2.2.2]octane dication is an N,N'-dimethyl-1,4-diazabicyclo[2.2.2]octane dication.

14. The method of claim 1, wherein the molecular sieve has a composition, as-synthesized and in its anhydrous state, in terms of mole ratios, as follows:

| | |
|---|---|
| $YO_2/W_2O_3$ | 5 to 1500 |
| $(Q + A)/YO_2$ | 0.015 to 0.06 | wherein Y is at least tetravalent element; W is at least one trivalent element; Q is at least one N,N,N-trialkyl adamantammonium cation, and Q>0; and A is at least one N,N'-dialkyl-1,4-diazabicyclo[2.2.2]octane dication, and A>0.

15. The method of claim 14, wherein Y is selected from the group consisting of Si, Ge and mixtures thereof.

16. The method of claim 15, wherein Y is Si.

17. The method of claim 14, wherein W is selected from the group consisting of B, Al and mixtures thereof.

18. The method of claim 14, wherein Y is Si and W is selected from the group consisting of B, Al and mixtures thereof.

* * * * *